United States Patent
Kumar et al.

(10) Patent No.: US 9,145,145 B2
(45) Date of Patent: Sep. 29, 2015

(54) SYSTEM AND METHOD FOR CONTROLLING A VEHICLE

(75) Inventors: Ajith Kuttannair Kumar, Erie, PA (US); Eugene A. Smith, Satellite Beach, FL (US); Paul Kenneth Houpt, Schenectady, NY (US); Glenn Robert Shaffer, Erie, PA (US); Joseph Forrest Noffsinger, Lee's Summit, MO (US); Brian J. McManus, Ft. Worth, TX (US); Jared Cooper, Melbourne, FL (US); David Michael Peltz, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/005,451

(22) PCT Filed: Dec. 30, 2011

(86) PCT No.: PCT/US2011/068090
§ 371 (c)(1),
(2), (4) Date: Sep. 16, 2013

(87) PCT Pub. No.: WO2012/092557
PCT Pub. Date: Jul. 5, 2012

(65) Prior Publication Data
US 2014/0032023 A1    Jan. 30, 2014

Related U.S. Application Data

(60) Provisional application No. 61/428,960, filed on Dec. 31, 2010.

(51) Int. Cl.
*B60W 40/105*   (2012.01)
*B60T 17/22*    (2006.01)

(52) U.S. Cl.
CPC ............ *B60W 40/105* (2013.01); *B60T 17/228* (2013.01)

(58) Field of Classification Search
CPC .......................... B60T 17/228; B60W 40/105
USPC .......................................... 701/20, 70, 93, 94
See application file for complete search history.

(56) References Cited

U.S. PATENT DOCUMENTS

| | | | |
|---|---|---|---|
| 2003/0105561 A1* | 6/2003 | Nickles et al. | 701/19 |
| 2004/0133315 A1 | 7/2004 | Kumar | |
| 2007/0219680 A1 | 9/2007 | Kumar | |
| 2009/0255329 A1* | 10/2009 | Connell et al. | 73/121 |

FOREIGN PATENT DOCUMENTS

| | | | |
|---|---|---|---|
| EP | 1522480 | 4/2005 | |
| EP | 1522480 A2 * | 4/2005 | B60T 17/22 |

OTHER PUBLICATIONS

PCT Search Report and Written Opinion from corresponding PCT Application No. PCT/US2011/068090, Dated Jun. 27, 2012.

* cited by examiner

*Primary Examiner* — Mary Cheung
*Assistant Examiner* — Brian P Sweeney
(74) *Attorney, Agent, or Firm* — GE Global Patent Operation

(57) ABSTRACT

A method for vehicle control comprises determining a braking capability of a braking system of a rail vehicle or other vehicle, and modifying application of at least one mission parameter by a control system of the vehicle based on the determined braking capability. Braking capability may be determined by activating the braking system of the vehicle to apply a braking force on the vehicle, and concurrently, applying a level of tractive effort of the vehicle is sufficient to overcome the braking force. The braking capability is determined based on the level of tractive effort.

9 Claims, 2 Drawing Sheets

SYSTEM AND METHOD FOR CONTROLLING A VEHICLE

This application is a National Stage of International Application No. PCT/US11/68090, filed Dec. 30, 2011, which claims the benefit of U.S. Provisional Application No. 61/428,960, filed Dec. 31, 2010.

BACKGROUND OF THE INVENTION

1. Field

Embodiments of the invention relate to vehicles, e.g., rail vehicles. Other embodiments relate to methods and systems for controlling rail vehicles or other vehicles.

2. Discussion of Art

Especially when various on-board systems are integrated with a vehicle braking system for conjointly operating the vehicle, the vehicle may be operated according to a "worst case" assumption of braking capability. For example, in the case of a locomotive or other rail vehicle, the rail vehicle may be operated according to the assumption that only fifty percent of mechanical braking capability (e.g., air brakes) is available and with no dynamic brake capability. Making such assumptions may result in the rail vehicle being slowed earlier than necessary, which results in a loss of average speed over a full duration of a trip/mission. Additionally, this may result in delay and loss of route capacity, considering that other vehicles also operate of the same route. Furthermore, the actual braking capability may actually be less than what is assumed, due to discrepancies between actual capabilities and assumed capabilities, brake system failures during a trip, environmental conditions, etc.

One approach currently utilized to assess braking capability of a rail vehicle is to check the air brakes prior to departure to ensure that air pressure is present. This approach, however, does not provide for a true determination of braking capability or effectiveness. This is because checking for air pressure does not convey any information about how much braking force would be applied in actually using the brakes during motoring, e.g., actual braking pads or shoes may not function properly, thus not being able to apply a full breaking force to wheels of the rail vehicle, even though a positive air pressure reading is obtained.

It may be desirable to have a vehicle control system, taking into account braking system capability, that differs from those vehicle control systems that are currently available.

BRIEF DESCRIPTION OF THE INVENTION

Embodiments of the present invention relate to systems and methods for vehicle control that determine a braking capability of a vehicle and control the vehicle based on the determined braking capability.

In one embodiment, a method for vehicle control comprises determining a braking capability of a braking system of a vehicle, and modifying application of at least one mission parameter by a control system of the vehicle based on the determined braking capability. (Mission parameter refers to a quantity or factor, relating to the vehicle or a mission of the vehicle, which is used by a control system as a basis for controlling the vehicle. Modifying application of the mission parameter may include modifying the parameter and applying the modified parameter the same as the parameter before modification, and/or applying the parameter in a different way than the parameter would have been applied previously.)

In another embodiment, a method for vehicle control comprises activating a braking system of a vehicle to apply a braking force on the vehicle. Concurrently, a level of tractive effort of the vehicle is applied sufficient to overcome the braking force. The method further comprises determining a braking capability of the vehicle based on the level of tractive effort, and controlling the vehicle based on the determined braking capability.

In another embodiment, a method for vehicle control comprises autonomously determining when a vehicle is moving along a route having a grade during a mission. (The grade may be a zero degree grade, a downhill grade, or an uphill grade; autonomously means by a machine, e.g., automatically.) The method further comprises applying the braking system of the vehicle while on the grade to test a capability of the braking system. The method further comprises modifying application (e.g., enforcement) of a mission parameter by the vehicle based on a result from the test.

Another embodiment relates to a system for a vehicle. The system comprises a braking capability module configured to determine a braking capability of a braking system of the vehicle. The system further comprises a control module operably coupled with the braking capability module and configured to modify application of a mission parameter by the control module based on the determined braking capability.

Another embodiment of a system for a vehicle comprises a location module configured to identify when a vehicle is moving along a route having a grade during a mission. The system further comprises a braking capability module configured to command applying a braking system of the vehicle while on the grade to test a capability of the braking system. The system further comprises a control module configured to modify application of a mission parameter by the control module based on a result from the test.

In embodiments, the vehicle in question is a locomotive, other single rail vehicle, a train, or another type of rail vehicle consist (e.g., a group of mining ore carts).

BRIEF DESCRIPTION OF THE DRAWINGS

Embodiments of the invention may be best understood by reference to the following description taken in conjunction with the accompanying drawing figures wherein.

DETAILED DESCRIPTION OF THE INVENTION

Figure 1:
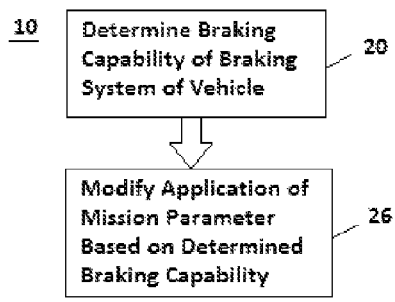
FIG. 1 is a flowchart illustrating a method for vehicle control, according to an embodiment of the invention.

Reference will be made below in detail to exemplary embodiments of the invention, examples of which are illustrated in the accompanying drawings. Wherever possible, the same reference numerals used throughout the drawings refer to the same or like parts; however, the existence of the same or like parts in multiple embodiments does not mean every embodiment of the invention necessarily includes such parts. Exemplary embodiments of the invention solve problems in the art by controlling a vehicle based on a determined condition of a braking system of the vehicle. Additionally, embodiments of the invention can be implemented in numerous ways, including as a system (including a computer processing system), a method (including a computerized method), an apparatus, a computer readable medium, a computer program product, or a data structure tangibly fixed in a computer readable memory. Several embodiments of the invention are discussed below.

Although embodiments are described herein in reference to locomotives and other rail vehicles, the invention is not limited as such, and is applicable to other types of vehicles. For example, exemplary embodiments of the invention may be used in other vehicles, such as, but not limited to, other off-highway vehicles, over road transportation systems, etc. Additionally, unless specifically referred to as a single or individual vehicle, the term vehicle includes vehicle consists, "consist" referring to a group of vehicles mechanically linked to travel together along a route.

Figure 2:
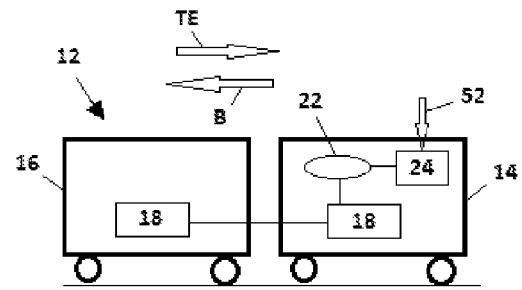
FIG. 2 is a schematic diagram of a vehicle consist, according to an embodiment of the invention.

With reference to FIGS. 1 and 2, an embodiment of the invention relates to a method 10 for controlling a vehicle 12 (in this case a consist including a first unit 14 and a second unit 16) based on a determined braking capability of a braking system 18 of the vehicle. Certain vehicles (e.g., rail vehicles) may include more than one braking mechanism or sub-system (e.g., an air brake sub-system, a dynamic braking sub-system, and/or a braking system utilized when operating in a distributed power configuration). Thus, the use of the term "braking system" may relate to an individual braking mechanism or sub-system in a vehicle or vehicle consist, or plural braking mechanisms or sub-systems collectively. The method 10 comprises determining a braking capability of the braking system 18 of the vehicle 12, at step 20, and modifying application (e.g., enforcement) of at least one mission parameter 22 by a control system 24 of the vehicle based on the determined braking capability, at step 26. As noted above, the mission parameter 22 comprises a quantity or factor, relating to the vehicle or a mission of the vehicle, which is used by the control system 24 as a basis for controlling the vehicle. Examples of mission parameters include maximum allowed speeds of a vehicle, safety thresholds relative to maximum allowed speeds, designated braking profiles for a vehicle (e.g., which specify how a vehicle is to be braked in certain designated situations), factors that are used by an energy management system to create a trip or mission plan for a vehicle, and the like. Modifying application of the mission parameter may include modifying the parameter and applying the modified parameter the same as the parameter before modification, and/or applying the parameter in a different way than the parameter would have been applied previously.

Figure 3:
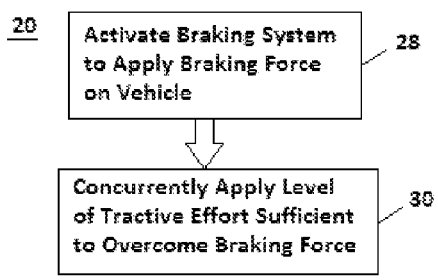
FIG. 3 is a flowchart illustrating a method for vehicle control, according to another embodiment of the invention.

The braking capability may be determined in different manners. With reference to FIGS. 2 and 3, in one embodiment, the step 20 of determining the braking capability comprises a step 28 of activating the braking system 18 of the vehicle to apply a braking force "B" on the vehicle. Activating the braking system 18 may comprise fully activating all braking mechanisms/sub-systems on the vehicle or vehicle consist, or fully activating one braking mechanism or sub-system, or fully activating all those braking mechanisms/sub-systems that can controlled automatically and/or that can be controlled with reasonably certainty about how the braking system will affect deceleration of a vehicle when moving and/or that are configured for use in slowing the vehicle while it is moving. (For example, a manual or other parking brake of an automobile or other vehicle would typically not be activated for assessing braking capability, since it is unpredictable in regards to how it would slow a vehicle, and is neither configured nor intended for slowing a vehicle while it is moving.) In one embodiment, the vehicle is a rail vehicle, and the step of determining the braking capability comprises determining a combined braking capability of air brake and dynamic brake portions of the braking system of the rail vehicle, or only the braking capability of the air brake portion. The step 20 of determining the braking capability further comprises, at step 30, concurrently applying a level of tractive effort "TE" of the vehicle sufficient to overcome the braking force. (B and TE are directionally shown in FIG. 2 with the assumption that the vehicle is configured to move from left to right.) The braking capability is determined based on the level of tractive effort.

To elaborate, braking capability is a level of force available to be applied by the braking system 18 for slowing the vehicle. Tractive effort is the pulling or pushing force exerted by a vehicle to move a load (itself and other mass, if any). At the point where the tractive effort overcomes the braking force, this means that the tractive effort is equal to, or just slightly higher than, the braking force. Thus, a measure of tractive effort at this point is indicative of braking capability. As should be appreciated, tractive effort does not necessarily refer to the maximum possible tractive effort of a vehicle (which is a function of vehicle configuration), but rather to the level of tractive effort currently being expended by the vehicle. It is assumed that the maximum possible tractive effort is greater than the maximum braking capability of the braking system. Tractive effort may be measured using force sensors (e.g., in a rail vehicle, drawbar or coupling strain sensors), and/or by leveraging information available to the vehicle traction system. For example, in the case of a diesel electric locomotive (engine runs an alternator for generating electricity to power traction motors), tractive effort may be derived based on the throttle level or other control inputs, which map to the energy demanded of the fraction system and the tractive effort, and/or on a per-axle basis based on the torque produced by each motor (determinable based on the electrical signals being applied to the motor and/or on sensor outputs of motor operation) and knowledge of wheel diameter and gear ratio (of gears between the motor and axle).

In embodiments of the vehicle control method, the braking system is activated (as at step 28) when the vehicle is stopped, and the level of tractive effort is gauged (as part of step 30) by identifying when the vehicle starts to move despite the braking force, for determining the braking capability. One example of activating the braking system when the vehicle is stopped is to do so at or before a time of departure of the vehicle. In other embodiments, the braking system is activated when the vehicle is moving. This may be done at times when braking is not needed to slow the vehicle for vehicle control purposes as part of its mission, or when the braking is needed to slow the vehicle for vehicle control purposes. The tractive effort of the vehicle is increased to maintain speed despite the braking, and the braking capability is determined based on the difference between the increased tractive effort and the level of tractive effort before braking (before the tractive effort was increased).

As noted above, embodiments of a control method include a step of modifying application of at least one mission parameter 22 by a control system 24 of the vehicle based on the determined braking capability. As further noted, modifying application of the mission parameter may include modifying the parameter and applying the modified parameter the same as the parameter before modification, and/or applying the parameter in a different way than the parameter would have been applied previously. As one example, the control system 24 may comprise an energy management system. One such energy management system is described in U.S. Patent Publication No. 2007/0219680, dated Sep. 20, 2007, incorporated by reference herein in its entirety. The energy management system creates a trip or mission plan for automatically controlling a vehicle along a route or for coaching an operator to control the vehicle along the route, based on mission parameters that may include information about the vehicle, information about the route of the vehicle, information about business objects of the mission (start point, end point, business-based time constraints, goal of mission plan), and/or physics or other models of how the vehicle operates. The goal of such mission plans may be to save fuel (versus controlling the vehicle in some other manner than the mission plan), or to arrive at a designated stop point at a given time (e.g., as fast as possible). The energy management system may be configured, as part of the physics or other models of vehicle operation, to create a mission plan based on an assumed braking capability of the vehicle. According to one aspect of the invention, instead of generating a trip or mission plan based on an assumed braking capability, the energy management system would receive information of the determined braking capability of the vehicle (i.e., an indication of actually how effective the braking system is in operation of the vehicle) and generate the trip or mission plan based on the determined braking capability. Thus, the mission parameter would be a vehicle braking information used by the energy management system to generate trip or mission plans, and the step of modifying application of the vehicle braking information would comprise using the determined braking capability instead of an assumed or default braking capability to generate the mission plan. Put another way, the step of modifying application of the at least one mission parameter may comprise modifying a mission plan that is generated on board the vehicle for controlling the vehicle during a mission of the vehicle.

As another example, the step of modifying application of the at least one mission parameter based on the determined braking capability may comprise modifying a designated speed and/or time of the mission, as part of a mission or trip plan or otherwise. For example, if the vehicle is designated to travel at a first speed under the default of an assumed braking capability, then according to aspects of the invention, it may be the case that the vehicle is instead designated to travel at a second speed, which is higher than the first speed, based on the determined (actual) braking capability. Higher speeds may be allowable because it is known, according to the determined braking capability, that the vehicle can be stopped according to designated criteria, e.g., within a designated minimum stopping distance, notwithstanding the higher speed.

Figure 4:
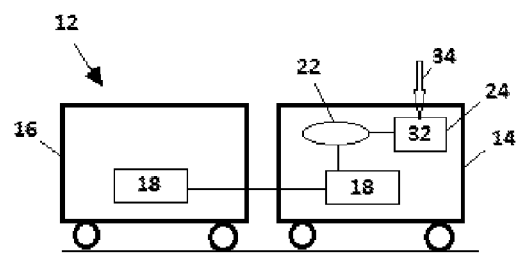
FIG. 4 is a schematic diagram of a vehicle consist, according to another embodiment of the invention.
Figure 5:
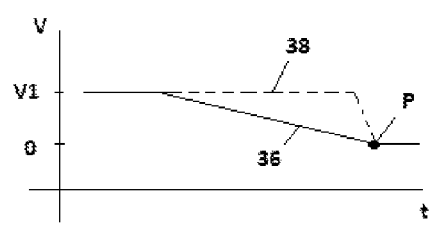
FIG. 5 is a velocity versus time profile showing two braking profiles.

As another example, with reference to FIG. 4, the control system 24 may comprise a positive train control or other vehicle safety system 32. The vehicle safety system 32 is configured to automatically control the vehicle 12, such as initiating braking of the vehicle, responsive to receiving a signal 34 from off-board the vehicle. (The signal would be generated off board for purposes of braking the vehicle for safety reasons, such as the vehicle violating a signal, the vehicle exceeding a designated speed limit, or to account for the unplanned movement of other vehicles, e.g., an unscheduled stop of another vehicle ahead of the vehicle.) The vehicle safety system may control braking of the vehicle according to a braking profile, which may specify an end target speed (e.g., relatively slow speed, or stop), a target location for stop, how soon the vehicle must commence braking, and/or how steep of a deceleration rate is allowed. Typically, such braking profiles are relatively conservative, meaning the vehicle must commence braking well ahead of a target stop location and/or brake very gradually. According to an aspect of the invention, however, instead of following a default braking profile, the vehicle safety system would receive information of the determined braking capability of the vehicle, and brake the vehicle based on the determined braking capability (while still meeting any set/"hard" constraints). This might allow the vehicle to be braked later than it would have been braked based on the default braking profile, or at a steeper deceleration rate (i.e., braked harder), thus providing time for the safety situation to possibly be resolved without having to slow the vehicle, while still allowing the vehicle to be actually braked to meet the set/hard safety constraints if the safety situation is not resolved. Thus, the mission parameter would be a default braking profile used by the vehicle safety system to brake the vehicle under certain designated conditions, and the step of modifying application of the braking profile would comprise modifying the default braking profile, for use in braking the vehicle, based on the determined braking capability (i.e., using a modified braking profile instead of a default braking profile). The modified braking profile might be configured for a less conservative braking strategy (e.g., steeper deceleration rates, and/or commencing braking later) relative to the default braking profile. One example is shown in FIG. 5, which illustrates a relatively more conservative default braking profile 36 for braking to a stop point "P," versus a relatively less conservative modified braking profile 38.

Figure 6:
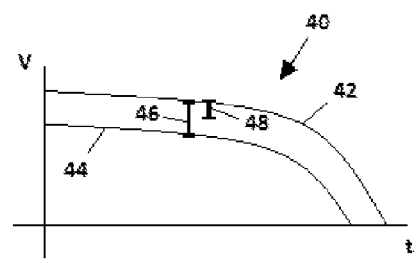
FIG. 6 is a velocity versus time profile showing modification of a default safety threshold to a maximum allowed speed profile.

In another embodiment of a control method, with reference to FIG. 6, the vehicle 12 is controlled according to a speed profile 40 that specifies one or more maximum allowed speeds 42 of the vehicle as a function of location and/or time. (The method illustrated in FIG. 6 is one example of modifying application of a speed enforcement parameter, in this case a safety threshold below a maximum allowed speed profile.) The mission parameter comprises a designated speed 44 of the vehicle (speed to which a vehicle is controlled); the designated speed 44 is less than the maximum allowed speed 42 for a current location and/or time of the vehicle by at least a safety threshold 46. In other words, the speed profile sets maximum allowed speeds, but the vehicle is controlled to a speed that is below the maximum allowed speed, for a given location and/or time, to provide a safety margin (the safety threshold 46) to reduce the likelihood of the vehicle exceeding the maximum allowed speed. According to the method, the designated speed 44 is modified, based on the determined braking capability, to a vehicle speed 48 within the safety threshold. Thus, due to having knowledge of the braking capability, the vehicle is controlled to a speed, for a given location and/or time, that is at or below the maximum allowed speed but above the safety threshold speed 46. (In other words, the magnitude of the safety threshold 46 is reduced based on the determined braking capability.)

Figure 7:
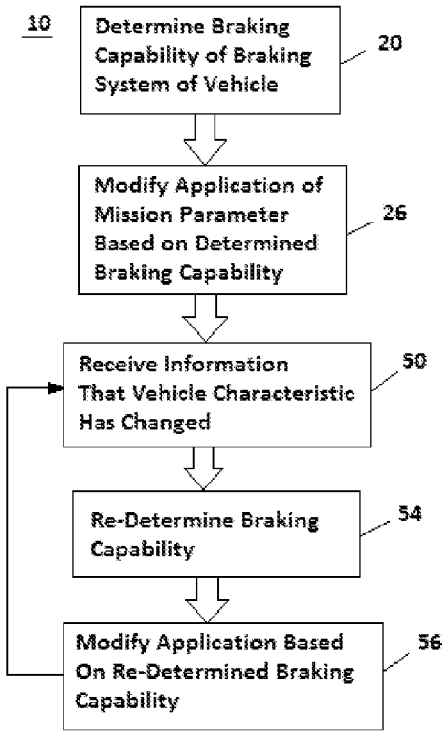
FIG. 7 is a flowchart of a method for vehicle control, according to another embodiment of the invention.

In another embodiment of the control method, the braking capability is re-determined, and application of the at least one mission parameter is modified based on the re-determined braking capability, when (or whenever) vehicle weight or another vehicle characteristic changes. This is because a change in a vehicle characteristic may have an effect on braking capability, e.g., lower weight generally means it is easier to slow the vehicle. For example, with reference to FIGS. 2 and 7, the method further comprises a step 50 of receiving information 52 indicative of a characteristic of the vehicle having changed. Responsive to receiving the information, the method comprises, at step 54, re-determining the braking capability of the braking system of the vehicle, and, as step 56, modifying application of the at least one mission parameter by the control system of the vehicle based on the re-determined braking capability. Characteristics for initiating re-determination of the braking capability may include, but are not limited to, weight of the vehicle (in the case of a train, such as if a rail car has been removed at an intermediate stop during a mission), a mechanical issue is experienced with the vehicle, etc. Any of the approaches discussed herein may be initiated or otherwise used responsive to a vehicle characteristic changing.

In embodiments, determining the braking capability additionally or alternatively comprises determining a stopping distance of the vehicle 12. The stopping distance may then be used as a basis for controlling the vehicle, e.g., braking is commenced at or before the vehicle is the stopping distance away from a designated stop point. A simplified model for determining stopping distance is stopping distance=$(0.5 MV^2)/f$, where M is the mass of the vehicle, V is the velocity of the vehicle, and f is the available braking force, e.g., determined as described herein.

Figure 8:
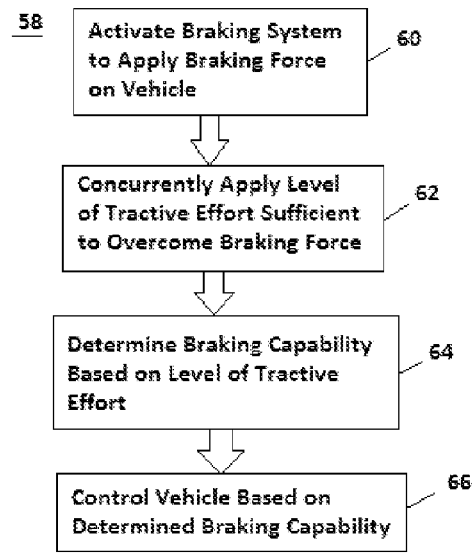
FIG. 8 is a flowchart of a method for vehicle control, according to another embodiment of the invention.

The method of FIG. 3 may be applied outside the context of modifying application of a mission parameter. For example, with reference to FIG. 8, another embodiment of a vehicle control method 58 comprises a step 60 of activating a braking system of a vehicle to apply a braking force on the vehicle. The method further comprises a step 62 of concurrently applying a level of tractive effort of the vehicle sufficient to overcome the braking force, and a step 64 of determining a braking capability of the vehicle based on the level of tractive effort. The method further comprises a step 66 of controlling the vehicle based on the determined braking capability. (Other portions of the present description are applicable to the method of FIG. 8. For example, the braking system may be activated when the vehicle is stopped, and the level of tractive effort may be gauged by identifying when the vehicle starts to move despite the braking force.)

Figure 9:
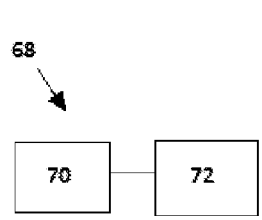
FIG. 9 is a schematic diagram of a vehicle control system, according to another embodiment of the invention.

With reference to FIG. 9, another embodiment relates to a system 68 for a vehicle. The system comprises a braking capability module 70 configured to determine a braking capability of a braking system of the vehicle. The system additionally comprises a control module 72 operably coupled with the braking capability module and configured to modify application of a mission parameter by the control module based on the determined braking capability. One or both of the braking capability module 70 and/or the control module 72 may be implemented as part of the control system 24. Additionally, one or both of the braking capability module 70 and/or the control module 72 may be further configured to carry out one or more of the other methods described herein.

Figure 10:
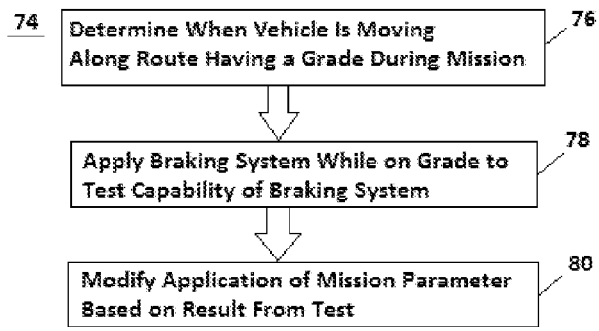
FIG. 10 is a flowchart of a method for vehicle control, according to another embodiment of the invention.

In another embodiment, with reference to FIG. 10, a method for vehicle control 74 comprises a step 76 of autonomously determining when a vehicle is moving along a route having a grade during a mission. (The grade may be a zero degree grade, a downhill grade, or an uphill grade; autonomously means by a machine, e.g., automatically.) The method further comprises, at step 78, applying the braking system of the vehicle while on the grade to test a capability of the braking system. The brakes may be applied additionally, separately, or independently of any applications of the braking system for traction/movement control purposes. The method further comprises, at step 80, modifying enforcement or other application of a mission parameter by the vehicle based on a result from the test. (The enforcement or application of the mission parameter may be modified as described herein in regards to other embodiments.)

In another embodiment of the method of FIG. 10, the braking system is applied to exceed an amount of braking applied by a control system of the vehicle for purposes of controlling the vehicle to traverse the grade. Thus, while the vehicle is traversing the grade, the control system may apply brakes for traction/movement control purposes, i.e., to slow the vehicle in order to safely traverse the grade. According to the method, during this time, the brakes are applied more than needed for the traction/movement control purposes, in order to test the braking capability of the braking system. In another aspect, the braking system is applied when the vehicle is traversing the grade, but at a time when the brakes are not being applied for traction/movement control purposes.

In another embodiment of the method of FIG. 10, the step of determining when the vehicle is moving along the route comprises autonomously determining when the vehicle is moving along a downhill grade of the route. The braking system is applied while the vehicle is on the downhill grade to test the capability of the braking system. It is possible to determine when the vehicle is traversing the downhill grade by correlating a current location of the vehicle (e.g., determined via GPS) with a route database that provides information of characteristics of the route of the vehicle. (Such route databases are used in many rail applications for energy management system calculations.)

In another embodiment of the method of FIG. 10, the braking system is applied to an extent and/or for a duration sufficient to test the capability of the braking system but not to significantly slow down the vehicle versus a speed of the vehicle before the braking system was applied. This may be accomplished by testing the braking system on a downhill grade when the vehicle is not being braked for traction control/movement purposes. That is, the braking may be matched to (or applied less than) the accelerating force exerted on the vehicle by gravity on the downhill. Thus, as the vehicle accelerates due to gravity, the brakes are applied for testing, slowing the vehicle, but with the net effect being no significant reduction in speed. According to one aspect, a significant speed reduction is more than 5%. In another aspect, a significant speed reduction is more than 2%. In another aspect, a significant speed reduction is more than 1%. (That is, for testing the braking on a downhill grade, the speed is reduced by no more than 5%, or 2%, or 1%.) The exact level allowed may depend on the characteristics of the train, the speed range of the train (e.g., higher speeds allow for a greater percentage decrease, since the train is still going relatively fast), and/or what is desired, from a business, train operation, and/or energy management perspective, for a given implementation. For example, a business decision may be made that testing takes priority over speed reductions, allowing, therefore, for a 5% max reduction, for example. As another example, an energy management system may dictate that the speed be reduced by no more than 1%, for example, to avoid excess fuel usage versus controlling the train according to a trip or mission plan but without the brake testing.

In another embodiment of the method of FIG. 10, a duration of applying the braking system to test the capability of the braking system is determined based on a slope of the downward grade. For example, for a steeper slope, it may be possible to brake the train harder, for determining braking capability, but for a shorter duration, versus braking the train on a less steep slope.

Figure 11:
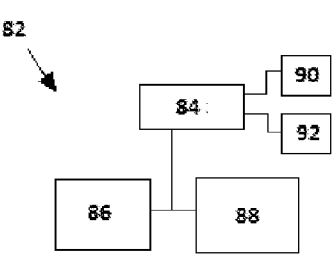
FIG. 11 is a schematic diagram of a vehicle control system, according to another embodiment of the invention.

FIG. 11 shows an embodiment of a system 82 for a vehicle. The system comprises a location module 84 configured to identify when a vehicle is moving along a route having a grade during a mission. The system additionally comprises a braking capability module 86 configured to command applying a braking system of the vehicle while on the grade to test a capability of the braking system. The system additionally comprises a control module 88 configured to modify application of a mission parameter by the control module based on a result from the test. The location module 84 may include, or have access to, a GPS module or other geographic position determination device 90 and/or a route database 92. Alternatively, travel on a grade may be determined using a tilt sensor or the like.

The system 82 may be further configured to carry out one or more other methods as described herein. For example, the location module may be configured to identify when the vehicle is moving along a downhill grade of the route, and the braking capability module may be configured to command applying the braking system of the vehicle while on the downhill grade.

The methods of FIGS. 1 and 10, and related systems, may determine braking capability in ways other than as described in FIG. 3. For example, braking capability may be determined by fully or otherwise applying the braking system, or sub-systems of interest, and calculating the braking capability based on a change in vehicle speed over a given distance, as a function of vehicle mass. A simplified model is braking force=$0.5M(V1^2-V2^2)/d$, where M is vehicle mass, V1 is a starting velocity of the vehicle, V2 is an ending velocity of the vehicle, and d is the distance traveled while slowing down from V1 to V2 (as determined, for example, using GPS or wayside markers).

As noted, determining the braking capability of the braking system of the vehicle may involve determining the overall braking capability (e.g., braking during movement capability, not factoring in parking brakes or the like), or the braking capability of one or more sub-systems of the braking system. For example, determining the braking capability may comprise determining the braking capability of each braking sub-system of a vehicle at a time of departure of the vehicle. Determining the braking capability of each braking system of the vehicle may comprise determining the braking capability at a time each braking system of the vehicle is applied as needed during a mission. Alternatively, it may comprise testing the braking capability of the vehicle at a time braking of the vehicle is not required. The testing may be carried out using a very brief application of at least one braking subsystem, where the test is so brief so as not to significantly slow the vehicle. The test may be done at a location where gravity experienced by the rail vehicle, such as traveling downhill, may further minimize any reduction in speed during the test.

Modifying enforcement or other application of a mission parameter by the vehicle based on the determined braking capability may comprise modifying a speed enforcement element (such as, but not limited to, a speed enforcement algorithm), an element that creates, on board the vehicle, a modified mission plan as the vehicle is motoring, and/or an element that enforces a desired mission speed and time of mission. Modifying enforcement or other application may also comprise using airbrake application timing to include locomotive consist/distributed power (DP) position wherein braking is different, since braking is applied from both ends of the rail vehicle as opposed to just one end of the rail vehicle.

As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively or additionally, a module may include a hard-wired device that performs operations based on hard-wired logic of the device. The module(s) shown in the attached figures may represent the hardware that operates based on software or hardwired instructions, the software that directs hardware to perform the operations, or a combination thereof.

The exemplary methods described herein may be implemented as sets of instructions stored on non-transient electronically readable media, for execution by a processor (the processor accesses the media and instructions, and performs control functions based on the contents of the instructions). Each element set forth in the flowcharts of the drawings may be implemented as a software module specific to performing the function of the element.

An apparatus, such as a data processing system, including a CPU, memory, I/O, program storage, a connecting bus, and other appropriate components, could be programmed or otherwise designed to facilitate the practice of exemplary embodiments of the method of the invention. Such a system would include appropriate program means (sets of instructions) for executing the method of the invention. Also, an article of manufacture, such as a pre-recorded disk, computer readable media, or other similar computer program product, for use with a data processing system, could include a storage medium and program means (sets of instructions) recorded thereon for directing the data processing system to facilitate the practice of the method of the invention. Such apparatus and articles of manufacture also fall within the spirit and scope of the invention.

Broadly speaking, a technical effect is to determine a condition of the braking system of a rail vehicle or other vehicle and to use the condition as a basis for controlling movement of the vehicle along a route. Exemplary embodiments of the invention may be described in the general context of computer-executable instructions, such as program modules, being executed by a device, such as, but not limited to, a computer, designed to accept data, perform prescribed mathematical and/or logical operations usually at high speed, where results of such operations may or may not be displayed. Generally, program modules include routines, programs, objects, components, data structures, etc., that perform particular tasks or implement particular abstract data types. For example, the software programs that underlie exemplary embodiments of the invention can be coded in different programming languages, for use with different devices, or platforms. It will be appreciated, however, that the principles that underlie exemplary embodiments of the invention can be implemented with other types of computer software technologies as well.

Moreover, embodiments of the invention may be practiced with other computer system configurations, multiprocessor systems, microprocessor-based or programmable consumer electronics, minicomputers, mainframe computers, and the like. Exemplary embodiments of the invention may also be practiced in distributed computing environments where tasks are performed by processing devices located at different locations on board of a vehicle, that are linked through at least one communications network. In a distributed computing environment, program modules may be located in both local and remote computer storage media including memory storage devices.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method for vehicle control comprising:
   with at least one controller, autonomously determining when a vehicle is moving along a route having a grade during a mission;
   with the at least one controller, applying the braking system of the vehicle while on the grade to test a capability of the braking system, wherein the braking system is applied at least one of additionally, separately, or independently of any applications of the braking system for traction or movement control purposes of the vehicle on the grade; and
   with the at least one controller, modifying application of a mission parameter by the vehicle based on a result from the test.

2. The method of claim 1, wherein applying the braking system comprises exceeding an amount of braking applied by the at least one controller for purposes of controlling the vehicle to traverse the grade.

3. The method of claim 1, wherein:
   the step of determining when the vehicle is moving along the route comprises autonomously determining, with the at least one controller, when the vehicle is moving along a downhill grade of the route; and
   the braking system is applied by the at least one controller while the vehicle is on the downhill grade to test the capability of the braking system.

4. The method of claim 3, wherein the braking system is applied to an extent and/or for a duration sufficient to test the capability of the braking system but not to significantly slow down the vehicle versus a speed of the vehicle before the braking system was applied.

5. The method of claim 3, wherein a duration of applying the braking system to test the capability of the braking system is determined based on a slope of the downhill grade.

6. A method for vehicle control comprising:
   with at least one controller, autonomously determining when a vehicle is moving along a route having a grade during a mission;
   with the at least one controller, applying the braking system of the vehicle while on the grade to test a capability of the braking system, wherein applying the braking system comprises exceeding an amount of braking applied by the at least one controller for purposes of controlling the vehicle to traverse the grade; and
   with the at least one controller, modifying application of a mission parameter by the vehicle based on a result from the test.

7. The method of claim 6, wherein the grade is an uphill grade or a downhill grade.

8. A method for vehicle control comprising:
   with at least one controller, autonomously determining when a vehicle is moving along a route having a grade during a mission;
   with the at least one controller, applying the braking system of the vehicle while on the grade to test a capability of the braking system; and
   with the at least one controller, modifying application of a mission parameter by the vehicle based on a result from the test,
   wherein: the step of determining when the vehicle is moving along the route comprises autonomously determining, with the at least one controller, when the vehicle is moving along a downhill grade of the route; the braking system is applied by the at least one controller while the vehicle is on the downhill grade to test the capability of the braking system; and the braking system is applied to an extent and/or for a duration sufficient to test the capability of the braking system but not to significantly slow down the vehicle versus a speed of the vehicle before the braking system was applied.

9. The method of claim 8, wherein a duration of applying the braking system to test the capability of the braking system is determined based on a slope of the downhill grade.

* * * * *